United States Patent
Zhong et al.

(10) Patent No.: US 11,570,995 B2
(45) Date of Patent: *Feb. 7, 2023

(54) COATING FOR ICED OR GLAZED FROZEN FOOD PRODUCTS

(71) Applicant: MANTROSE-HAEUSER CO., INC., Westport, CT (US)

(72) Inventors: Bin Zhong, North Attleboro, MA (US); Xiangdong Gan, Franklin, MA (US)

(73) Assignee: Mantrose-Haeuser Co., Inc., Westport, CT (US)

(*) Notice: Subject to any disclaimer, the term of this patent is extended or adjusted under 35 U.S.C. 154(b) by 211 days.

This patent is subject to a terminal disclaimer.

(21) Appl. No.: 17/025,410

(22) Filed: Sep. 18, 2020

(65) Prior Publication Data

US 2021/0059265 A1 Mar. 4, 2021

Related U.S. Application Data

(63) Continuation of application No. 15/808,028, filed on Nov. 9, 2017, now Pat. No. 10,779,547, which is a continuation of application No. 13/133,273, filed as application No. PCT/US2009/066916 on Dec. 7, 2009, now Pat. No. 9,861,107.

(60) Provisional application No. 61/120,534, filed on Dec. 8, 2008.

(51) Int. Cl.
*A21D 15/02* (2006.01)
*A23G 3/34* (2006.01)
*A23P 20/10* (2016.01)
*A21D 13/24* (2017.01)
*A21D 13/60* (2017.01)
*A21D 13/28* (2017.01)

(52) U.S. Cl.
CPC ............ *A21D 15/02* (2013.01); *A21D 13/24* (2017.01); *A21D 13/28* (2017.01); *A21D 13/60* (2017.01); *A23G 3/343* (2013.01); *A23P 20/10* (2016.08); *A23P 20/105* (2016.08)

(58) Field of Classification Search
None
See application file for complete search history.

(56) References Cited

U.S. PATENT DOCUMENTS

| | | | |
|---|---|---|---|
| 4,135,005 | A | 1/1979 | Cheng |
| 4,810,534 | A | 3/1989 | Seaborne et al. |
| 5,523,039 | A | 6/1996 | Martin |
| 6,159,514 | A | 12/2000 | Brummett et al. |
| 6,348,217 | B1 | 2/2002 | Santos et al. |
| 6,869,628 | B2 | 3/2005 | Krochta et al. |
| 9,861,107 | B2 | 1/2018 | Zhong et al. |
| 2004/0096548 | A1 | 5/2004 | Stevens et al. |
| 2004/0166211 | A1 | 6/2004 | Gesford et al. |
| 2008/0145493 | A1 | 6/2008 | Myers |

FOREIGN PATENT DOCUMENTS

| | | | |
|---|---|---|---|
| CA | 993713 | A1 | 7/1976 |
| EP | 0090559 | A1 | 10/1983 |
| EP | 0988801 | | 3/2000 |
| EP | 1832172 | | 9/2007 |
| EP | 1985188 | A1 | 10/2008 |
| FR | 2689376 | A1 | 10/1993 |
| JP | 07327610 | | 12/1995 |
| JP | H0-7327610 | | 12/1995 |
| JP | 09-140322 | | 6/1997 |
| JP | 10108630 | | 4/1998 |
| JP | 2006-501845 | | 1/2006 |
| JP | 2006262764 | | 10/2006 |
| JP | 2012510823 | | 5/2012 |
| WO | 03068001 | A1 | 8/2003 |
| WO | 2006007470 | A1 | 1/2006 |
| WO | 2008076902 | A1 | 6/2008 |
| WO | 2008129417 | A1 | 10/2008 |

OTHER PUBLICATIONS

International Search Report and Written Opinion for International Application No. PCT/US09/66916, dated Jan. 26, 2010.
Examination Report No. 1 from Australian Patent Application No. 2009324805, dated Dec. 11, 2013.
Patent Examination Report No. 2 for Australian Patent Application No. 2009324805 dated Feb. 3, 2015.
Notice of Acceptance from Australian Patent Application No. 2009324805 dated Aug. 11, 2015.
Office Action from Mexican Patent Application No. MX/a/2011/006040, dated Aug. 2013.
Third Office Action for Mexican Patent Application No. MX/a/2011/006040 dated Nov. 24, 2014.
Fourth Office Action for Mexican Patent Application No. MX/a/2011/006040 dated Oct. 1, 2015.
First Examination Report for European Patent Application No. 09832418.9 dated Jun. 6, 2017.
Examination Report from European Patent Application No. 09832418.9 dated Nov. 16, 2017.
Search Report from European Patent Application No. EP 09 83 2418 dated Feb. 19, 2015.
English Text Portion of First Office Action from Chinese Patent Application No. 200980154525.8 dated May 29, 2013.
Second Office Action from Chinese Patent Application No. 20098015425.8 dated Dec. 11, 2013.
Third Office Action for Chinese Patent Application No. 200980154528.8 dated Apr. 24, 2014.
Fourth Office Action for Chinese Patent Application No. 200980154525.8 dated Apr. 29, 2015.
Notice of Final Rejection for Chinese Patent Application No. 200980154525.8 dated Nov. 3, 2014.
Notice of Reasons for Rejection from Japanese Patent Application No. 2011-539770 dated Feb. 22, 2013.

(Continued)

*Primary Examiner* — Jenna A Watts
(74) *Attorney, Agent, or Firm* — Calfee, Halter & Griswold LLP

(57) ABSTRACT

The gloss of iced frozen baked goods once thawed, is enhanced by coating the baked goods with shellac prior to freezing.

19 Claims, 4 Drawing Sheets

(56) References Cited

OTHER PUBLICATIONS

Notice of Final Rejection received in Japanese Patent Application No. 2011-539770, dated Aug. 15, 2013.
Office Action from Korean Patent Application No. 10-2011-7015923, dated Oct. 30, 2013.
Notice of Final Rejection from Korean Patent Application No. 10-2011-7015934, dated May 15, 2014.
Search Report for Singapore Patent Application No. 2013090725 dated Mar. 16, 2015.
Dea, Peter., "Sweet Success: Nutty Confections", Available online from foodproductdesign.co as of Feb. 1, 2004, pp. 1-9.
Raab, C. et al., "Freezing Convenience Foods that you've prepared at home", Available online as of 2002 from https://catalog.extension.oregonstate.edu. pp. 1-6 and 13.
Kobs, Lisa, "Shining up Appearances", Available online from foodproductdesign.com as of May 1, 2000. pp. 1-6.
Database WPI, Week 2006, Thomson Scientific, London, GB; AN2006-664533; XP002736131 & JP2006 262764 A (Ajinomoto KK) Oct. 5, 2006 (Oct. 5, 2006) *abstract*.
Database WPI, Week Aug. 1996, Thomson Scientific, London, GB; AN1996-072273; XP002736132 & JP H07 327610 A (Ajinomoto KK) Dec. 19, 1995 (Dec. 19, 1995) *abstract.
"Simple Donut Recipe and Donut Frosting", Uncle Phaedrus Consulting Detective and Finder of Lost Recipes. Available online as of Mar. 15, 2006 from www.hungrybrowser.com/phaedrus. pp. 1-6.
Karise Daijiro, "Pan-seiho (production method of bread)," Numato Shoten, Sep. 1, 1974, 8th Edition, pp. 408-413. No English translation available.
Definition of "pearlescent" on thefreedictionary.com. Retrieved Aug. 8, 2012. p. 1.
Jewitt, Jeff, Choosing and Applying a Traditional Shellac Finish:, Copyright 2003. Available online from www.woodcentral.com. pp. 1-7.
Machine Translation of JP 07-327610 to Matsumoto et al., Publication Dated Dec. 19, 1995, pp. 1-14.
Machine translation of JP2006262764A, dated Feb. 25, 2015, 8 pages.
Machine translation of JP H07327610 A (Ajinomoto KK); Feb. 26, 2015, 20 pages.

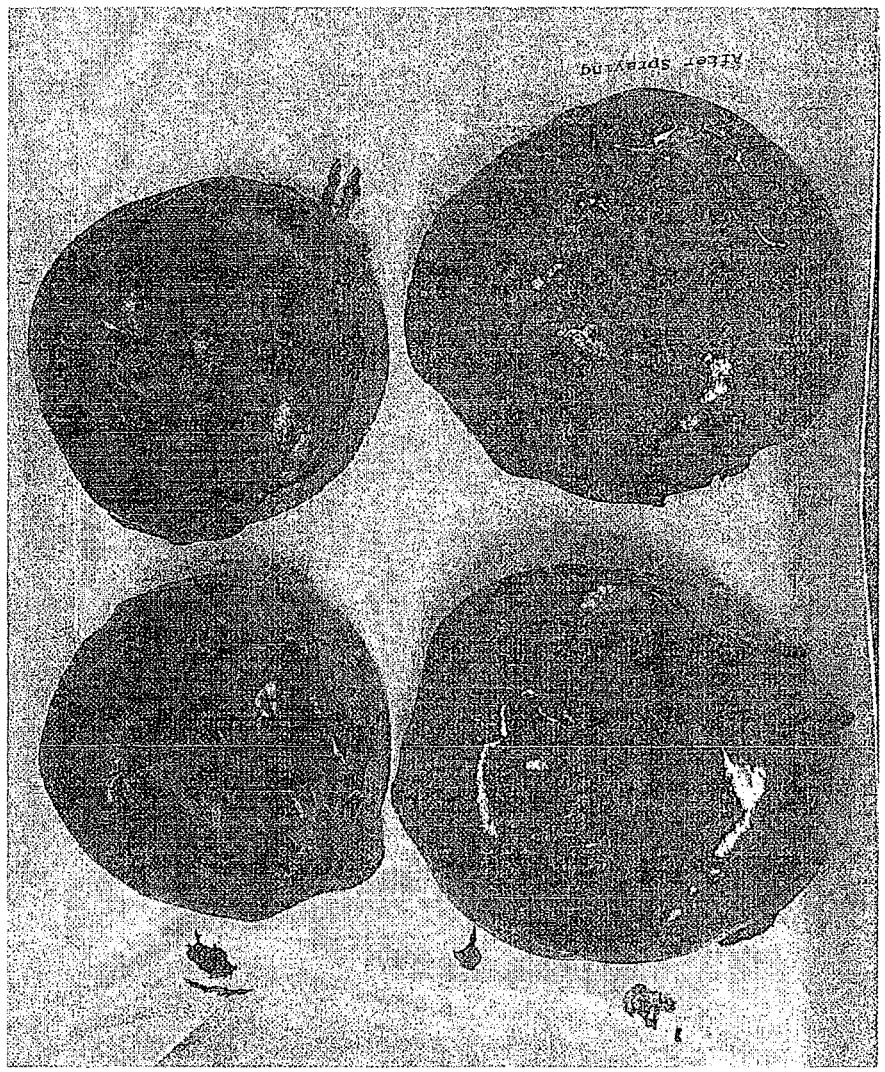

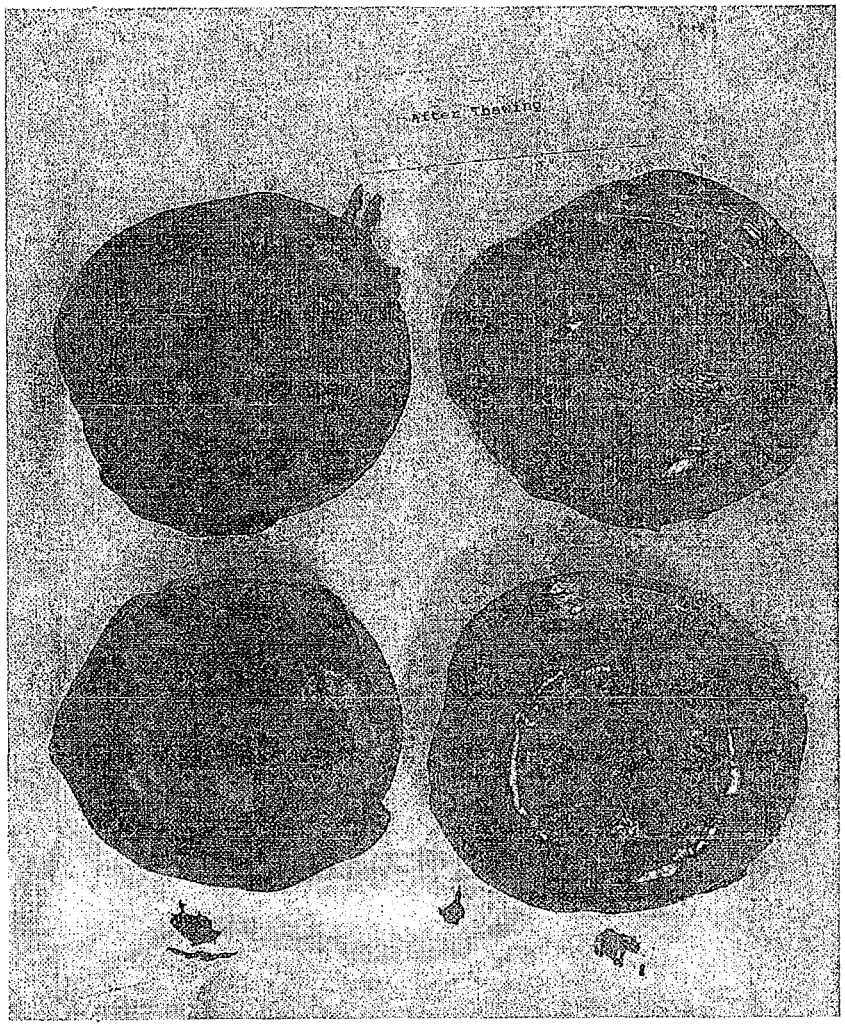

COATING FOR ICED OR GLAZED FROZEN FOOD PRODUCTS

CROSS REFERENCE TO RELATED APPLICATION

This application is a continuation of U.S. patent application Ser. No. 15/808,028, filed Nov. 9, 2018, now U.S. Pat. No. 10,779,547, which is a continuation of U.S. patent application Ser. No. 13/133,273, filed Jun. 7, 2011, now U.S. Pat. No. 9,861,107, which is a 371 application of International Patent Application No. PCT/US09/66916, having an International filing date of Dec. 7, 2009, which claims benefit of U.S. Provisional Patent Application No. 61/120,534, filed Dec. 8, 2008, all of which are incorporated herein by reference in their entirety as if fully rewritten herein.

FIELD OF INVENTION

This invention relates to iced, glazed or frosted frozen food products that retain their gloss or shine when thawed.

BACKGROUND

In addition to yeast dough doughnuts, a number of other frozen food products, particularly frozen bakery products, carry an external layer of an icing, frosting or sweetened glaze ("iced frozen food products"). These include cakes, cookies, cake dough doughnuts, pastries, muffins, etc. When such iced frozen food products are thawed, either by exposure to microwaves or ambient or slightly elevated temperatures, the icing, frosting or glaze loses its shine or gloss within a few hours or days, thereby making the thawed product appear less fresh to the consumer.

SUMMARY OF THE INVENTION

In accordance with this invention, this reduction in gloss is eliminated or at least substantially reduced by coating the product prior to freezing with an edible, ethanol soluble, glossy film forming material such as shellac and/or zein.

Accordingly, this invention provides a frozen food product exhibiting enhanced surface gloss when thawed, this frozen food product comprising a food substrate, a sweetened edible coating on the food substrate, and a coating of an edible, ethanol soluble, glossy film forming material on the sweetened edible coating.

In addition, this invention also provides a thawed frozen food product produced by allowing the above frozen food product to thaw to room temperature.

Furthermore, this invention also provides a process for increasing the gloss exhibited by a frozen food product after it is thawed, the frozen food product comprising a food substrate and a sweetened edible coating on the food substrate, this process comprising coating the sweetened edible coating with an edible, ethanol soluble, glossy film forming material before freezing.

Still further, this invention also provides a package of one or more frozen donuts comprising a freezer stable container and at least one donut in the container, each frozen donut comprising a donut, a sweetened edible coating on the donut, and a coating of an edible, ethanol soluble, glossy film forming material on the sweetened edible coating.

BRIEF DESCRIPTION OF THE DRAWINGS

This invention may be more readily understood by reference to the following drawings wherein:

FIGS. 1A, 1B, 2A and 2B are photographs illustrating the results obtained in the following working Examples 1 and 2, these results demonstrating the effect of freezing and thawing on the surface gloss of iced donuts treated in accordance with this invention relative to otherwise identical untreated control donuts; and

DETAILED DESCRIPTION

Iced Frozen Food Products

Figure 1A:
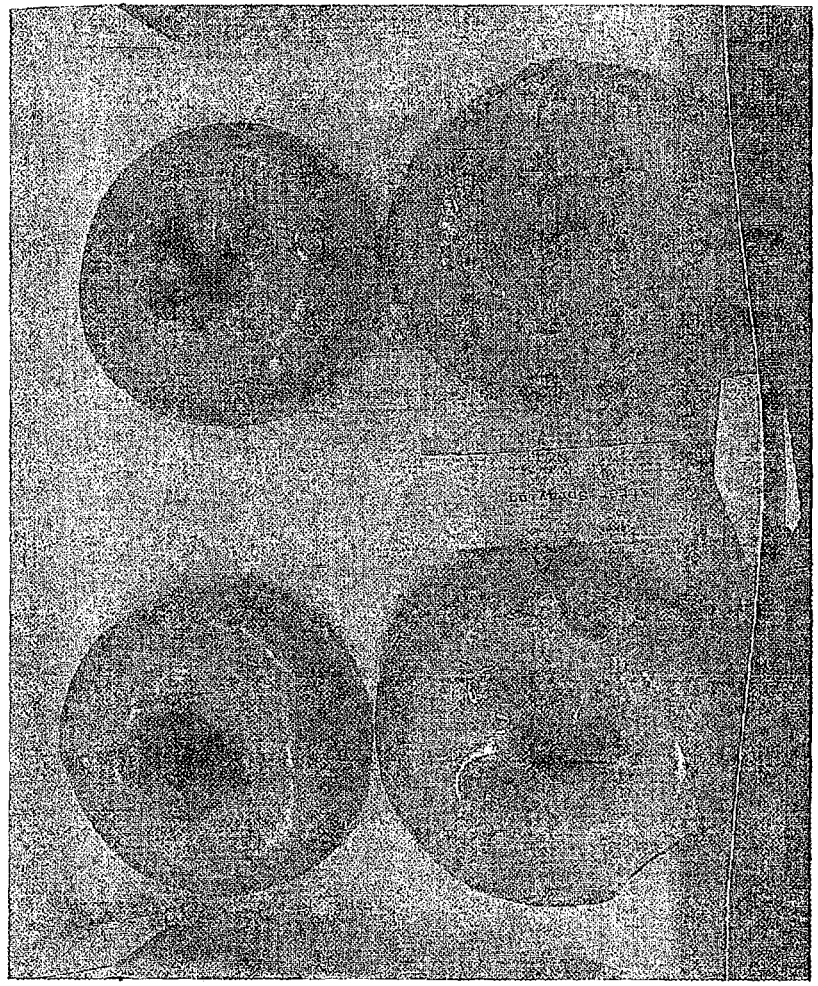

This invention is applicable to any frozen food product which carries a coating or surface layer formed from an icing, frosting or sweetened glaze ("iced frozen food product"). Most commonly, it will be applied to donuts, both yeast dough donuts and cake dough donuts, although it can also be used with equal advantage on muffins, cookies, cakes, pastries, and other bakery products.

Iced frozen food products are becoming increasingly popular. Typically, they are mass-produced in a central factory location where they are immediately frozen to a suitable temperature, typically −20° C., before or after packaging, and then shipped to the customer. In some instances, these products are marketed as convenience foods for thawing by the ultimate consumer. If so, the products are packaged in freeze-resistant containers (i.e., containers appropriate for storing frozen foods) of a consumer-convenient size, i.e., in a quantity convenient for the ultimate customer to use at home such as for example in packages of 21 or less, 12 or less, 6 or less, 5 or less or even individually, and sold through supermarkets to the ultimate consumer who stores them in a home freezer and then thaws them when needed. In other instances, these products are packaged and marketed in bulk to restaurants and other commercial establishments. If so, the products are packaged in freeze-resistant containers of industrial size, i.e., in a quantity convenient for storage and handling by commercial establishments such as for example in packages of 25 or more, 50 or more or even 75 or more, but more commonly on the order of 100, 500 or even 1000 or more, for storage in bulk in industrial freezers and then thawing as needed for serving to ultimate consumers. In both cases, the frozen food products are stored at temperatures commonly found in home and industrial freezers, which can range anywhere from −5° C. or less, but are typically on the order of −10° to −30° C.

Iced frozen food products are typically made by coating the underlying food product ("food substrate") with a layer of an icing, frosting or sweetened glaze (collectively: "sweetened edible coating") prior to freezing for adding extra nutrition, flavor, color, taste, appearance, etc. "Icing" and "frosting" refer to fat-containing compositions which, when applied to food products and dried, produce spreadable, self-supporting, sweetened coatings. "Spreadable" in this context means that the mixture can be easily spread into a thin, relatively uniform coating with a spatula or knife, while "self-supporting" in this context means that the shape of this coating once applied will not change due to gravity. "Icing" and "frosting" are synonymous in this disclosure, and so the following description refers only to "frosting" for convenience. A "sweetened glaze" in the context of this disclosure refers to an essentially fat-free coating composition which, when applied to a food product and dried, produces an essentially-hardened, sweetened coating. "Essentially-hardened" in this context means that the glaze coating once applied and dried cannot be spread with a spatula or knife. Also, "frozen" as used in this disclosure in connection with a "frozen food product" means that the temperature of the product is at or below the freezing point of water, 0° C. Meanwhile, "thawed" as used in this disclosure in connection with a "thawed frozen food product" means that the temperature of the product is above the freezing point of water after the product has been previously frozen.

Both sweetened glazes and frostings include sweeteners and sufficient water to form a liquid or spreadable composition. Sweeteners commonly used for this purpose include naturally-occurring sugars such as sucrose, fructose, dextrose, maltose, lactose, corn syrup, corn syrup solids, high fructose corn syrup, invert sugar, and a sugar-starch grind of a crystalline sweetener mixed with a starch. Artificial sweeteners such as sugar alcohols, e.g., maltitol, sorbitol, glycerin, isomalt, erythritol, mannitol, xylitol, lactitol, hydrogenated starch hydrosylates, tagatose, trehalose and combinations thereof, can also be used.

In addition to sweeteners, frostings also contain fats. Suitable fats for this purpose include shortenings, such as partially hydrogenated soybean oils, partially hydrogenated cottonseed oils, and combinations thereof. Additionally or alternatively, other solid or liquid oils such as palm oil, palm kernel oil, peanut oil, corn oil, coconut oil, sunflower oil, canola oil, safflower oil, butter, and animal fats, such as lard and tallow, and combinations thereof, can be used. Trans-free fats (fats having trans fat levels of less than 0.5 grams per serving) may also be used.

Frostings can be regarded as falling into two different categories, non-chocolate frostings and chocolate-based frostings. Chocolate already contains a not-insignificant amount of fat, and so chocolate-based frostings are typically formulated with less added fat than non-chocolate frostings.

In addition to sweeteners, fats and water, frostings typically contain a variety of additional ingredients for controlling and/or improving taste, color, texture and "feel" (i.e., viscosity and rheology). For example, frostings typically contain natural and/or artificial flavorants such as vanilla, chocolate liquor, fudge, fruit flavors, chocolate, milk chocolate, coconut, pecan, lemon, cream cheese, French vanilla, chocolate cream cheese, strawberry, walnut, almond, and so forth, and combinations thereof, for enhancing taste. In addition, they also often contain conventional food coloring agents and/or pigments for improving appearance. Some of these flavorants, coloring agents and pigments may also be found in sweetened glazes.

Frostings also can contain one or more of rheology control agents such as emulsifiers, polysaccharide gums and modified starches and for enhancing the viscosity/rheology of the frosting product. Suitable emulsifiers for this purpose include mono- and diglycerides, polysorbate 60, polysorbate 80, sodium caseinate, sodium stearyl lactylate, diacetyl tartaric acid esters of mono- and diglycerides (DATEM), propylene glycol monostearate, polyglycerol esters of fatty acids, and combinations thereof. Suitable polysaccharide gums include xanthan gum, gum agar, guar gum, locust bean gum, tragacanth, karaya, hydroxypropylcellulose, methylcellulose, pectin, alginates, and combinations thereof. Modified starches are widely used in foods as thickening and stabilizing agents and are prepared by partially degrading starch or starch granules to increase their stability against excessive heat, acid, and/or freezing, or to change their texture, and/or or to lengthen or shorten gelatinization time.

Specific frosting recipes that have been used commercially and by ultimate consumers include:
1. Chocolate Glaze Frosting
   ¾ cup semisweet chocolate chips
   3 tablespoons butter
   1 tablespoon light corn syrup
   ¼ teaspoon vanilla extract In a double boiler over hot, but not boiling water, combine chocolate chips, butter and corn syrup. Stir until chips are melted and mixture is smooth, then add vanilla. Spread warm glaze over top cake, letting it drizzle down the sides.

2. Chocolate Glaze Frosting
   1 (14 oz.) can sweetened condensed milk
   1 tablespoon water
   ⅛ teaspoon salt
   1 (1 ounce) squares unsweetened chocolate
   ½ teaspoon vanilla extract In a double boiler, combine milk, water, salt and chocolate. Heat, stirring constantly until thick. Remove from heat and allow to cool. Add vanilla.

3. Chocolate Glaze Frosting
   ½ cup unsalted butter
   ¼ cup whole milk, warmed
   2 teaspoons vanilla extract
   4 ounces bittersweet chocolate, chopped
   2 cups confectioners' sugar, sifted Combine butter, milk, and vanilla in medium saucepan and heat over medium heat until butter is melted. Decrease the heat to low, add the chocolate, and whisk until melted. Turn off heat, add the powdered sugar, and whisk until smooth. Place the mixture over a bowl of warm water and dip the doughnuts immediately. Allow glaze to set for 30 minutes before serving.

4. Chocolate Fudge Icing
   1 stick butter
   ½ c. cocoa
   ⅓ c. milk
   1 lb. powdered sugar
   1 tablespoon vanilla Melt butter, add cocoa and boil 1 minute. Add remaining ingredients and beat until smooth. Spread while warm.

5. Donut Glaze Icing
   ¼ cup whole milk
   1 teaspoon vanilla extract
   2 cups confectioners' sugar Combine milk and vanilla in a medium saucepan and heat over low heat until warm. Sift confectioners' sugar into milk mixture. Whisk slowly, until well combined. Remove the glaze from the heat and set over a bowl of warm water. Dip doughnut into the glaze, one at a time, and set on a draining rack placed in a half sheet pan for 5 minutes before serving.

6. Donut Frosting
   ¼ cup solid vegetable shortening
   ¼ butter or margarine
   ½ teaspoon clear vanilla extract
   2 cups sifted confectioners' sugar
   1 tablespoon milk Cream butter and shortening, gradually add sugar ½ cup at a time. Add milk and vanilla, beat until light and fluffy. Will keep for 2 weeks in airtight, refrigerated container.

7. Donut Glaze
   2 cups powdered sugar
   1 teaspoon mapleine
   Water

Add enough water to make frosting thick enough to spread. Spread while warm.

As can be seen from the above recipes, it is not uncommon for two or more ingredients used in a particular frosting formula to be supplied together from a common source. For example, semisweet chocolate chips supply both flavorant and sweetener, while sweetened condensed milk and corn syrup each supply both sweetener and water.

As indicated above, a common problem associated with glazed frozen food products is that the frosting coating loses its shine or gloss within a few hours or days after being thawed. This, in turn, makes the thawed iced food product appear less fresh to the consumer. This phenomenon is illustrated in FIGS. 1 A and 1 B, which are photographs taken of the frosting-coated donuts described more thoroughly in the following working Example 1, these photographs being taken before freezing (FIG. 1 A) and then again after freezing followed by thawing for 30 minutes (FIG. 1 B). The upper two donuts in both FIGS. 1 A and 1 B are control donuts representing the prior art, i.e., these frosted donuts were not coated with shellac in accordance with this invention. By comparing these control donuts before freezing (FIG. 1 A) with the same donuts after freezing (FIG. 1 B), it can be seen that freeze/thawing significantly reduce the gloss of the frostings on these particular donuts.

In accordance with this invention, this problem is eliminated or at least substantially reduced by coating the donuts, before freezing, with an edible, ethanol soluble, glossy film forming material ("glossy film former") such as shellac, zein or a mixture of both.

Edible, Glossy, Film Coating

Shellac has been used as a coating for a variety of products, including food products, for many years. For example, shellac has been used for many years as a glazing agent for confections such as chocolate covered raisins, chocolate covered nuts, gum balls, jelly beans, etc. In addition, shellac has also been used for many years as a protective coating and glaze for vitamins, tablets, various time-release preparations, and various fruits such as apples and the like, both whole and in sections. In addition, many patents and other publications describe using shellac as a glazing agent for a variety of different food products, including donuts. See, for example, the background section of U.S. Pat. No. 6,869,628 as well as Paragraph [0006] of U.S. 2004/0096548. However, prior to this invention, shellac has not been used (or described as useful) as a coating for preventing or retarding the reduction in gloss that normally occurs when sweetened glazes or frostings are frozen and then subsequently thawed.

Shellac is a naturally occurring thermoplastic obtained from secretions of the female lac bug. It exhibits a remarkable combination of properties making it an ideal food packaging material, these properties including low permeabilities to oxygen, water vapor, $CO_2$, ethylene and various odors, low lipid solubility, excellent color and excellent clarity.

Commercially, shellac is obtained from seedlac, an insect secretion, by removing debris from the seedlac and then dissolving the cleaned seedlac in aqueous alkali or alcohol. If desired, the extracted shellac can be dewaxed, bleached or both. See, col. 2, line 47 to col. 3, line 6 of U.S. Pat. No. 6,348,217 for a more thorough description of this process. All four of these products, i.e., orange shellac, dewaxed orange shellac, regular bleached shellac ("waxy white shellac" in Europe) and refined bleached shellac, are available commercially in a variety of different forms including dry, solid form, aqueous solution, and alcohol solution normally dissolved in ethanol as the solvent.

To make storage and transportation easier, shellac coatings are often formulated commercially from dried, solid shellac. For this purpose, the shellac can be dissolved in aqueous alkaline solution, dispersed in neutral or slightly acidic water using a suitable dispersing agent, or dissolved in an appropriate food grade organic solvent such as an alcohol or the like, particularly ethanol. In this connection, see U.S. Pat. No. 5,523,039 (especially the Background section) and U.S. Pat. No. 6,348,217. The entire disclosures of both of these patents are incorporated herein by reference.

Any of the shellac-containing liquids described above can be used as the shellac coating compositions of this invention. Organic based compositions, especially those in which the shellac is dissolved in a suitable food grade solvent such as an alcohol and especially ethanol, are especially interesting.

It is also common practice in industry to include various adjuncts to shellac coating compositions to modify/improve various properties. Examples of such adjuvants include medium chain triglycerides, vegetable oils, acetylated monoglycerides, propylene glycol and polyethylene glycol (PEG). Any such adjuvant can be used in this invention, provided it is accepted for food-grade use.

Another edible, ethanol soluble, film forming material that can be used to provide freeze-resistant glossy protective coatings in accordance with this invention is zein. Zein is a class of prolamine proteins found in maize. It is usually manufactured as a powder from corn gluten meal. In its pure form, zein is clear, odorless, tasteless, hard, water-insoluble, and edible, like shellac. It is useful as a coating for candy, nuts, fruit, bakery products, pills, and other encapsulated foods and drugs. It is classified as GRAS (Generally Recognized as Safe) by the U.S. Food and Drug Administration.

In addition to shellac and zein, any other material which is edible, soluble in ethanol and which dries from an ethanol solution to form a glossy film can be used to provide the freeze-resistant glossy protective coatings of this invention. In this context, "soluble in ethanol" means that the solubility of the material in ethanol is at least about 10 grams per liter.

The amount of glossy film former applied to the iced food product being treated in accordance with this invention can vary widely, and essentially any amount can be used. Generally, the amount used should be enough to provide a noticeable improvement in the gloss of the iced food product before freezing. In other words, if the amount of glossy film former applied to the sweetened glaze or frosting coating is enough to develop a noticeable improvement in its gloss before the iced food product is frozen, then this amount is also generally sufficient to prevent or at least substantially retard the reduction in gloss of this sweetened glaze or frosting that would otherwise occur as a result of freezing and thawing in the absence of this shellac coating.

In a preferred embodiment of the invention in which an alcohol solution of shellac is applied to iced donuts, it has been found appropriate to dissolve 3 to 4 pounds of solid particulate shellac in one gallon of alcohol and then apply about 0.05 to 5.0 gms, preferably about 0.08 to 2.0 gms, or even about 0.1 to 1.0 grams of this solution to each donut of conventional size (e.g., toroid having an outside diameter of about 7-11 cm and an inside diameter of about 1.5-3 cm). Corresponding amounts of shellac can be applied to other bakery products, while corresponding amounts of zein and other edible, ethanol soluble, glossy film forming materials can be applied to all of these bakery products including donuts.

The glossy film former of this invention can be applied to the glazed or frosting coated food products of this invention anytime before freezing, including days or even weeks before freezing. For convenience, however, the lead time between application of the glossy film former and onset of freezing will be normally be far shorter, typically about 0.5 minute to 1 hour, about 1 to 30 minutes, or even about 2-15 minutes, since this is normally long enough to enable the applied shellac coating to substantially dry before freezing.

Intermediate Coating

Normally, the glossy film former of this invention is directly applied to the sweetened edible coating of the food product being treated. In some embodiments, however, it may be beneficial to first apply an intermediate protective layer to the sweetened edible coating before applying the glossy film former. For example, if the sweetened edible coating is especially soluble in ethanol, it may be desirable to first apply an intermediate protective layer having limited solubility in ethanol in order to minimize migration of ethanol into the sweetened edible coating from an ethanol solution of the subsequently applied glossy film former. Examples of suitable materials that can be used for providing such intermediate protective layers include water-based starch coatings, various water-based gums, food grade wax dispersed in vegetable oil, etc.

EXAMPLES

In order to more thoroughly illustrate this invention, the following working examples are presented:

Example 1

The following procedure was used to compare the gloss formed on frosting coated donuts treated in accordance with this invention with otherwise identical control donuts not treated in accordance with this invention, both before freezing and after thawing. The particular donuts used in this example were plain cake donuts obtained from a Dunkin' Donuts retail store, while the frosting used was a white glaze commercially available frosting obtained from Dawn Foods Products, Inc. of Denver, Colo.

Heat the donuts in an oven at a 65° C. for 30 min.
After removing the donuts from the oven, coating the donuts with approximately 15 to 18 grams frosting per donut by pouring the frosting (heated to 25° C. in a water bath) over the donuts.
Allowing the frosting to dry for 40 min. at room temperature.
Spray coating the dried frosting with about 0.5 grams per donut of a commercially available shellac solution (3.2 # cut Crystalac I obtained from Mantrose-Hauser of Westport, Conn., which is a mixture of refined bleached shellac and a small amount of vegetable oil dissolved in ethanol)
Allowing the shellac coating to dry at room temperature for about 2.5 min.
Freezing the donuts by placing the donuts in a freezer for 30 min. at −20° C.
Removing the donuts from the freezer and allowing them to thaw at ambient temperature for 30 min.

FIG. 1A is a photograph taken of these donuts before freezing. The two donuts in the lower portion of FIG. 1A were coated with shellac in accordance with this invention. The two donuts in the upper portion of FIG. 1A are controls, which were not treated with shellac in accordance with this invention. As can be seen from FIG. 1A, the donuts treated with shellac in accordance with this invention, before freezing, exhibited a noticeably greater gloss than the untreated control donuts.

FIG. 1B is a photograph taken of these donuts after freezing and thawing. As can be seen from this photograph, the two donuts in the lower portion of this photograph which had been coated with shellac in accordance with this invention exhibited a high gloss essentially the same as the gloss exhibited by these same donuts before freezing (FIG. 1A). On the other hand, the two control donuts in the upper portion of this same photograph which had not been coated with shellac exhibited less gloss than those of the inventive donuts in the lower portion of this same photograph and, in addition, less gloss than these same donuts before freezing (upper donuts in FIG. 1A). This shows that that, while freeze/thawing had essentially no effect on the gloss of the shellac-coated donuts made in accordance with this invention, it imparted a noticeable reduction to the gloss of the untreated control donuts.

Example 2

Example 1 was repeated except that the particular frosting used was a Chocolate Icing commercially available from Dawn Foods Products. The results obtained are illustrate in FIGS. 2A and 2B. As in the case of Example 1 and FIGS. 1A and 1B, FIGS. 2A and 2B also show that freeze/thawing reduced the gloss of the untreated control donuts but did not reduce the gloss of the shellac-coated donuts made in accordance with this invention.

Example 3

Example 1 was repeated except that the particular donuts used were preglazed cake donuts carrying a conventional sugar glaze obtained from Dunkin' Donuts. In addition, these donuts were allowed to thaw for a total of 4,110 minutes (68.5 hours), with the results obtained being observed at certain intervals during that period, in particular at 30, 60, 90, 150, 1230 and 4,110 minutes after initiation of thawing. The results obtained were recorded in photographs.

Visual inspection of these photographs showed that the gloss of the control donuts was noticeably less than the gloss of the donuts made in accordance with this invention in all cases. More significantly, the gloss of the control samples became progressively worse over time whereas the gloss of the samples made in accordance with this invention remained essentially the same from over the entire 68.5 hour time period of the test. These results show that, while freeze/thawing does not adversely affect the gloss of the shellac-coated donuts made in accordance with this invention, it does indeed did adversely affect the gloss of the untreated control samples. In addition, these results further showed that this adverse effect gets progressively worse as time goes on which, in turn, suggests that the advantage provided by this invention—maintenance of superior gloss over time in a thawed, previously frozen iced food product—may become even more pronounced over time.

Example 4

Example 3 was repeated except that the particular donuts used were chocolate flavored cake-type donuts coated with a chocolate frosting. The results obtained were recorded in additional photographs. Visual inspection of these photographs showed that the same results were achieved as were obtained in Example 3, i.e., freeze/thawing did not adversely affect the gloss of the shellac-coated donuts made in accordance with this invention but did adversely affect the gloss of the untreated control samples, this adverse effect getting progressively worse with time.

Example 5

Example 3 was repeated, including taking photographs of the results obtained, except that a maple flavored frosting was used. These photographs also showed that freeze/thawing did not adversely affect the gloss of the shellac-coated donuts made in accordance with this invention but did adversely affect the gloss of the untreated control samples, this adverse effect getting progressively worse with time.

Although only a few embodiments of this invention have been described above, it should be appreciated that many modifications can be made without departing from the spirit and scope of the invention. All such modifications are to be included within the scope of this invention, which is to be limited only by the following claims:

What is claimed is:

1. A food product, comprising
an edible food coating having a surface gloss coated on a substrate,
an edible, ethanol soluble, glossy film forming material coating disposed on the edible food coating;
wherein the edible, ethanol soluble, glossy film forming material coating eliminates or substantially reduces loss of the surface gloss of the edible food coating after freezing and thawing that would otherwise occur in the absence of the edible, ethanol soluble, glossy film forming material coating.

2. The food product of claim 1, wherein the edible food coating comprises a frosting, icing or glaze.

3. The food product of claim 1, wherein the edible food coating is a chocolate icing.

4. The food product of claim 1, wherein the food product is a bakery product.

5. The food product of claim 1, wherein the edible, ethanol soluble, glossy film forming material coating comprises shellac, zein or a mixture thereof.

6. The food product of claim 1, wherein the edible, ethanol soluble, glossy film forming material coating comprises dewaxed orange shellac, regular bleached shellac or refined bleached shellac.

7. The food product of claim 1, wherein the edible, ethanol soluble, glossy film forming material coating is formed from a coating composition, wherein the coating composition further comprises one or more adjuncts selected from the group consisting of medium chain triglycerides, vegetable oils, acetylated monoglycerides, propylene glycol and polyethylene glycol (PEG).

8. A food product, comprising
an edible food coating having a surface gloss coated on a substrate,
an edible, ethanol soluble, glossy film forming material coating disposed on the edible food coating;
wherein the edible, ethanol soluble, glossy film forming material coating enhances the surface gloss of the edible food coating after freezing and thawing that would otherwise occur in the absence of the edible, ethanol soluble, glossy film forming material coating.

9. The food product of claim 8, wherein the edible food coating comprises a frosting, icing or glaze.

10. The food product of claim 8, wherein the edible food coating is a chocolate icing.

11. The food product of claim 8, wherein the food product is a bakery product.

12. The food product of claim 8, wherein the edible, ethanol soluble, glossy film forming material coating comprises shellac, zein or a mixture thereof.

13. The food product of claim 8, wherein the edible, ethanol soluble, glossy film forming material coating comprises dewaxed orange shellac, regular bleached shellac or refined bleached shellac.

14. The food product of claim 8, wherein the edible, ethanol soluble, glossy film forming material coating is formed from a coating composition, wherein the coating composition further comprises one or more adjuncts selected from the group consisting of medium chain triglycerides, vegetable oils, acetylated monoglycerides, propylene glycol and polyethylene glycol (PEG).

15. A food product, comprising
an edible food coating having a surface gloss coated on a substrate,
an edible, ethanol soluble coating disposed on the edible food coating;
wherein the edible, ethanol soluble coating eliminates or substantially reduces loss of the surface gloss and/or enhances the surface gloss of the edible food coating after freezing and thawing that would otherwise occur in the absence of the edible, ethanol soluble coating.

16. The food product of claim 15, wherein the food product is a bakery product.

17. The food product of claim 15, wherein the edible food coating is a chocolate icing.

18. The food product of claim 15, wherein the edible, ethanol soluble coating comprises shellac, zein or a mixture thereof.

19. The food product of claim 15, wherein the edible, ethanol soluble coating is formed from a coating composition, wherein the coating composition further comprises one or more adjuncts selected from the group consisting of medium chain triglycerides, vegetable oils, acetylated monoglycerides, propylene glycol and polyethylene glycol (PEG).

* * * * *